(12) United States Patent
Grimm et al.

(10) Patent No.: US 9,643,459 B2
(45) Date of Patent: May 9, 2017

(54) WHEEL DRIVE HAVING A ROTARY UNION

(71) Applicant: Robert Bosch GmbH, Stuttgart (DE)

(72) Inventors: Raimund Grimm, Iserlohn (DE);
Benjamin Rosenbaum, Arnsberg (DE);
Alexander Baar, Hagen (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 14/547,259

(22) Filed: Nov. 19, 2014

(65) Prior Publication Data

US 2015/0136291 A1   May 21, 2015

(30) Foreign Application Priority Data

Nov. 19, 2013   (DE) .......................... 10 2013 223 512

(51) Int. Cl.
*B60C 23/00* (2006.01)
*B60B 27/00* (2006.01)

(52) U.S. Cl.
CPC ........ *B60C 23/003* (2013.01); *B60B 27/0047* (2013.01)

(58) Field of Classification Search
CPC .......................... B60C 23/003; B60B 27/0047
See application file for complete search history.

(56) References Cited

U.S. PATENT DOCUMENTS

| | | | |
|---|---|---|---|
| 6,199,611 B1* | 3/2001 | Wernick ................ | B60C 23/003 152/417 |
| 8,783,314 B2* | 7/2014 | Tigges .................. | B60C 23/003 141/38 |
| 2008/0006357 A1* | 1/2008 | Wakabayashi ........ | F16C 19/184 152/415 |
| 2009/0084481 A1* | 4/2009 | Kalavitz ............... | B60C 23/003 152/417 |
| 2009/0211682 A1* | 8/2009 | Sobotzik ............... | B60C 23/003 152/415 |
| 2009/0223615 A1* | 9/2009 | Isono .................... | B60C 23/004 152/419 |
| 2013/0112327 A1* | 5/2013 | Tigges ................... | B60C 29/00 152/415 |

FOREIGN PATENT DOCUMENTS

| | | |
|---|---|---|
| AT | 391 298 B | 9/1990 |
| DE | 35 07 232 A1 | 9/1986 |
| EP | 1 167 140 A2 | 1/2002 |

* cited by examiner

*Primary Examiner* — Kip T Kotter
(74) *Attorney, Agent, or Firm* — Maginot, Moore & Beck LLP

(57) ABSTRACT

A wheel hub drive with a planetary transmission includes a wheel hub rotatably mounted on a fixed component and at least one fluid-carrying passage. The fixed component is configured to receive a tire with a gaseous filling. The at least one fluid-carrying passage extends indirectly as far as the tire through the fixed component in order to regulate the gas pressure in the tire. An annular rotary union defines at least a portion of the at least one fluid-carrying passage and is configured to connect the fixed component fluidically to the tire. The annular rotary union is arranged axially between the fixed component and the rotatably mounted wheel hub.

18 Claims, 5 Drawing Sheets

WHEEL DRIVE HAVING A ROTARY UNION

This application claims priority under 35 U.S.C. §119 to patent application no. DE 10 2013 223 512.7, filed on Nov. 19, 2013 in Germany, the disclosure of which is incorporated herein by reference in its entirety.

BACKGROUND

The present disclosure relates to a wheel hub drive having a planetary transmission, comprising a wheel hub, rotatably mounted on a fixed component, for receiving a tire with a gaseous filling and at least one fluid-carrying passage, which extends indirectly as far as the tire through the fixed component in order to regulate the gas pressure in the tire.

The area of application of the disclosure extends especially to motor vehicles, particularly preferably to off-road motor vehicles for agricultural use. During off-road operation, regulation of the gas pressure in the tires is desired in order to adapt the tire and the contact surface thereof to the respective underlying surface during movement. In the case of a loose underlying surface, e.g. mud, plowland, fields or snow, the gas pressure in the tires can be reduced in order to set a larger and more flexible contact surface of the tires. In the case of a hard underlying surface, e.g. asphalt, in contrast, the gas pressure in the tires can be increased in order to reduce rolling resistance and thereby reduce wear and consumption. The wheel hub is generally driven either hydrostatically or electrically. However, other drive options are also conceivable.

The publication EP 1 167 140 A2 discloses a wheel drive, particularly for mobile machines, having a supporting axle, which is attached to the vehicle frame in a manner fixed against rotation relative thereto and is rotatably connected by means of a rolling bearing arrangement to an annulus acting as a wheel hub. The annulus is driven by means of at least one planetary transmission having an input-side sun wheel, and an integrated dynamic service brake is provided between the annulus and the supporting axle. Within the annulus, the service brake is arranged directly behind a detachable transmission cover at the end and, radially on the outside, is arranged on a brake carrier in the form of a hollow cylinder forming the end piece of the non-rotatable supporting axle. As seen from the end, the planetary transmission is furthermore arranged behind the service brake within the annulus. The holding brake is actuated by means of the force of a brake spring, wherein the holding brake is held in the open position hydraulically via a pressure medium passage by means of the piston.

The publication DE 3 507 232 C2 discloses a wheel hub drive of compact construction having a planetary transmission. A wheel hub to be driven is rotatably mounted by means of rolling bearings on the end of an axle housing body. The planetary transmission for driving the wheel hub is arranged at the end of the axle housing body. The planetary transmission consists of a pinion shaft, which is guided through the axle housing body and has a sun wheel at its end, of a planet carrier housing, on which the planet wheels meshing with the sun wheel are mounted and which, for its own rotatable mounting and for motive power transmission, is connected to the wheel hub, and of an internally toothed annulus, which meshes with the planet wheels and is connected in a fixed manner to the axle housing body in order to transmit the reaction torque. For this purpose, use is made of a coupling wheel, which engages by means of an external toothing on the outer circumferential rim in the internal toothing of the annulus and is connected non-rotatably and detachably to the axle housing body. The releasable connection, transmitting the reaction torque, between the coupling wheel and the axle housing body consists in the coupling wheel and the axle housing body being designed at their mutually facing ends with matching inter-meshing teeth and the coupling wheel being rigidly flanged on at the end of the axle housing body.

The publication AT 391 298 B discloses a device for supplying and discharging compressed air to and from the pneumatic tires for motor vehicles having a wheel hub planetary transmission running gear assembly, having an air supply via a connection piece arranged in a bore in a shaft joint housing. The connection piece is connected via a bore in the shaft joint housing to a connection housing, which is closed by means of resilient seal rings and to which an axial bore in a half shaft guided by means of rolling bearings in the shaft joint housing is connected. Provided at the axially outer end of the half shaft is a centering guide bearing, the outer shell of which rests on the inner circumference of a connection cover provided with an air-carrying bore and designed as a cylindrical pot. A central spigot of the connection cover projecting axially inward from the connection cover is sealed off by means of a sealing collar and projects into a central receiving bore in the half shaft. The outer rim of the connection cover is connected to the end of the planet carrier of the wheel hub planetary transmission by way of a flexible insert.

The compressed air required to inflate the pneumatic tire is passed via a connection piece and through a bore in the shaft joint housing into a connection housing, which ensures loss-free transfer of the air to an axial bore in a half shaft with the aid of O-rings and radial shaft seal rings. The half shaft is passed through a rolling bearing from the connection housing side. To prevent oil from leaking through, a radial shaft seal ring is installed. The connection cover is connected to the manually actuated valve by a flexible line, thus allowing the air to flow into the interior of the pneumatic tire via a valve line. The tire pressure cannot be regulated during driving since there is only one fluid-carrying passage to regulate the tire pressure. The tire is mounted on a rim.

It is therefore the object of the present disclosure to provide a wheel hub drive having a planetary transmission, which drive is of compact construction and allows regulation of the tire pressure during driving.

SUMMARY

The object is achieved by a wheel hub drive having the features of the disclosure. Advantageous developments of the disclosure will be apparent from the subsequent dependent claims.

According to the disclosure, an annular rotary union having at least one fluid-carrying passage for connecting the fixed component fluidically to the tire is arranged axially between the fixed component and the rotatably mounted wheel hub. Consequently, the rotary union is arranged outside the fixed component and the rotatably mounted wheel hub and comes to rest axially on the fixed component, on the one hand, and on the rotatably mounted wheel hub, on the other hand. Thus, the axial space between the fixed component and the rotatably mounted wheel hub is used to integrate the rotary union. Consequently, no additional installation space is required. As a particularly preferred option, the rotary union has two fluid-carrying passages, wherein a first fluid-carrying passage is provided for controlling, in particular opening and closing, a valve on the tire and a second fluid-carrying passage is provided to regulate the pressure in the tire. The fixed component furthermore forms the supporting axle of the wheel hub drive. The planetary transmission is situated within the rotatably mounted wheel hub. The planetary transmission preferably has at least two planetary stages. The annular rotary union is furthermore constructed from a metallic material.

The disclosure includes the technical teaching that the rotary union comprises an inner ring element and an outer ring element, wherein the inner ring element is connected to the fixed component in a manner fixed against rotation relative thereto and the outer ring element is connected to the rotatably mounted wheel hub in a manner fixed against rotation relative thereto. By way of the support of the rotatably mounted wheel hub on the fixed component, the rotary union is thereby also supported. Since the outer ring element is connected to the rotatably mounted wheel hub in a manner fixed against rotation relative thereto, it rotates along with the wheel hub. The inner ring element is fixed and does not perform any rotary motion.

An annular gap is preferably formed axially between the fixed component and the outer ring element, said gap being sealed off by a dynamic seal element arranged therebetween. This annular gap is necessary to ensure that the outer ring element does not rub against the fixed component and thus wear the latter. The dynamic seal element prevents dirt from getting into the annular gap between the fixed component and the outer ring element. It is advantageous if the dynamic seal element is arranged on the fixed component and rests on the outer ring element in such a way that the annular gap is thereby closed.

As a particularly preferred option, the fixed component has at least one bore for feeding lubricant into the annular gap formed between the fixed component and the outer ring element. It is advantageous if the lubricant is either a grease or an oil.

The dynamic seal element furthermore prevents the lubricant from escaping. The lubricant cools the rotary union and reduces the wear on the rotary union.

At least one fluid-carrying passage is preferably arranged along a circumferential surface of the outer ring element in order to connect the fixed component fluidically to the tire. Consequently, the at least one fluid-carrying passage extends from an outer circumferential surface to an inner circumferential surface of the outer ring element. If a plurality of fluid-carrying passages is arranged along the circumferential surface of the outer ring element, these are spaced apart not only tangentially but also preferably axially. In other words, two fluid-carrying passages are arranged spaced apart along the circumferential surface of the outer ring element, for example, and additionally axially offset, with the result that they are situated in different axial planes.

As a particularly preferred option, at least one transverse bore, together with at least one bore along a circumferential surface of the inner ring element, forms at least one fluid-carrying passage for connecting the fixed component fluidically to the tire. In other words, a bore which opens into another bore running transversely thereto is formed on the front face in the inner ring element. Together, the two bores form a closed fluid-carrying passage which carries the fluid out of the fixed component, through the inner ring element, into the outer ring element. It is advantageous if a plurality of fluid-carrying passages is formed spaced apart in the circumferential direction in the inner ring element. Moreover, these fluid-carrying passages are also spaced apart axially.

According to a preferred embodiment, both the outer ring element and the inner ring element have at least one transverse bore for receiving respective screw elements. As a particularly preferred option, the at least one transverse bore is arranged between two fluid-carrying passages in the inner ring element. The transverse bore can furthermore also comprise a thread, which interacts with a screw thread. By means of the at least one transverse bore and the respective screw element, the outer ring element is fastened to the rotatably mounted wheel hub and the inner ring element is fastened to the fixed component.

Another preferred option is one according to which at least two dynamic seal elements for fluidically sealing the fluid-carrying passages in the outer and in the inner ring element are arranged radially between the outer and the inner ring element in respective recesses provided for that purpose. The recesses are preferably located on the inner circumferential surface of the outer ring element. However, it is also conceivable to form the recesses on the outer circumferential surface of the inner ring element.

The disclosure includes the technical teaching that respective encircling grooves are formed either on the outer circumferential surface of the inner ring element or on the inner circumferential surface of the outer ring element so as to coincide axially with the respective fluid-carrying passages. Owing to the relative movement between the outer ring element and the inner ring element, the encircling groove allows a permanent fluid-carrying connection between the inner ring element and the outer ring element.

The at least one fluid-carrying passage in the fixed component preferably passes axially through the fixed component and is connected fluidically to the at least one fluid-carrying passage in the inner ring element. There is an O-ring for the fluidic sealing of the transition between the two fluid-carrying passages, which is situated axially between the fluid-carrying passages, on a recess provided for this purpose on the inner ring element.

BRIEF DESCRIPTION OF THE DRAWINGS

Further measures that improve the disclosure are explained in greater detail below with reference to the figures together with the description of preferred illustrative embodiments of the disclosure.

DETAILED DESCRIPTION

Figure 1A:
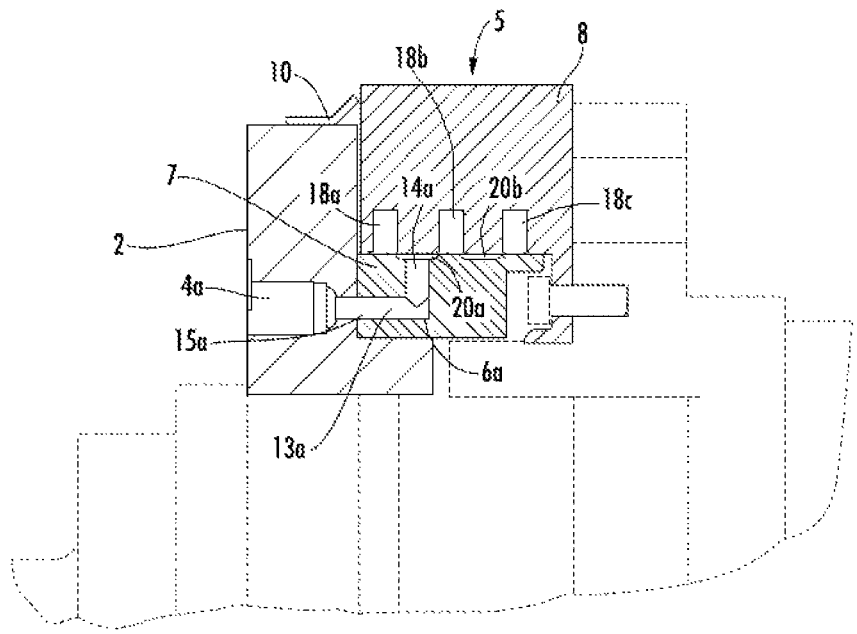
FIG. 1a shows a schematic sectional view of a wheel hub drive with a rotary union having two fluid-carrying passages according to section line 1a in FIG. 2.
Figure 1B:
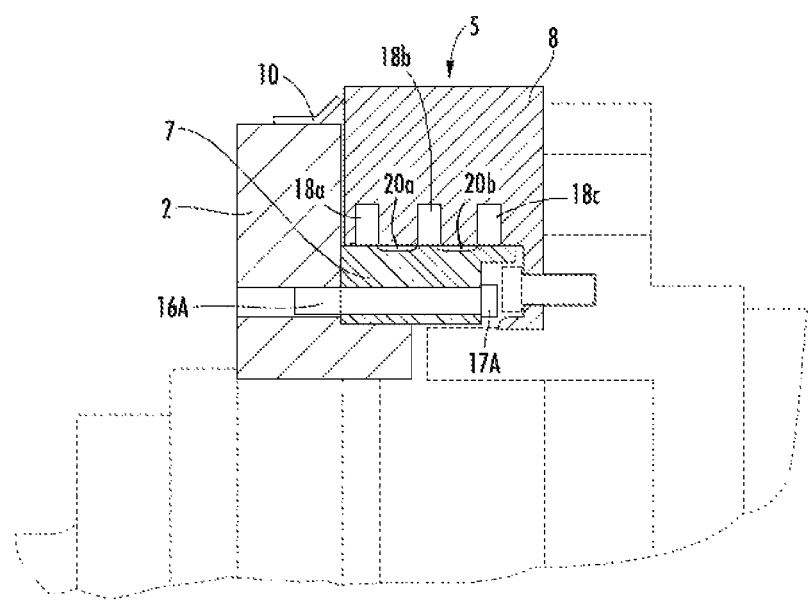
FIG. 1b shows a schematic sectional view of a wheel hub drive with a rotary union having two fluid-carrying passages according to section line 1b in FIG. 2.

According to FIGS. 1a-1f, a wheel hub drive having a planetary transmission 1 has a fixed component 2, which serves as a supporting axle, and a rotatably mounted wheel hub 3 for receiving a tire—not shown here—with a gaseous filling. An annular rotary union 5 having two fluid-carrying passages 6a, 6b is arranged axially between the fixed component 2 and the rotatably mounted wheel hub 3. A first fluid-carrying passage 6a is provided for controlling, in particular opening and closing, a valve—not shown here—on the tire and a second fluid-carrying passage 6b is provided for regulating the pressure in the tire. The rotary union 5 has an inner ring element 7 and an outer ring element 8, wherein the inner ring element 7 is connected to the fixed component 2 in a manner fixed against rotation relative thereto by means of a screw element 17a, and the outer ring element 8 is connected to the rotatably mounted wheel hub 3 in a manner fixed against rotation relative thereto by means of a screw element 17b.

Two fluid-carrying passages 12a, 12b are arranged radially along a circumferential surface of the outer ring element 8. The two fluid-carrying passages 12a, 12b are arranged spaced apart in the outer ring element 8, both axially and in the circumferential direction. Dynamic seal elements 18a, 18b, 18c for fluidically sealing off the two fluid-carrying passages 6a, 6b are arranged axially between the two fluid-carrying passages 12a, 12b, in recesses 19a, 19b, 19c provided for this purpose. The inner ring element 7 is arranged radially on the inner circumferential surface of the outer ring element 8, wherein the inner ring element 7 has respective encircling grooves 20a, 20b on an outer circumferential surface so as to coincide axially with the respective fluid-carrying passages 12a, 12b. A respective bore 14a, 14b leads radially from each encircling groove 20a, 20b into the inner ring element 7, each of said bores opening into respective transverse bores 13a, 13b and forming the respective fluid-carrying passages 15a, 15b therewith. The two transverse bores 13a, 13b have an angular spacing with respect to one another in the circumferential direction. The two bores 14a, 14b are therefore offset relative to one another axially in accordance with the passages 12a, 12b and the annular grooves 20a, 20b and in the circumferential direction in accordance with the angular spacing of the transverse bores 13a, 13b. The fluid-carrying passages 15a, 15b are connected fluidically to respective threaded connection bores 4a, 4b in the fixed component 2. An annular gap 9 is formed axially between the fixed component 2 and the outer ring element 8, said gap being sealed off by a dynamic seal element 10 arranged therebetween. Lubricant is fed into the annular gap 9 between the fixed component 2 and the outer ring element 8 via a bore 11 in the fixed component 2.

Figure 2:
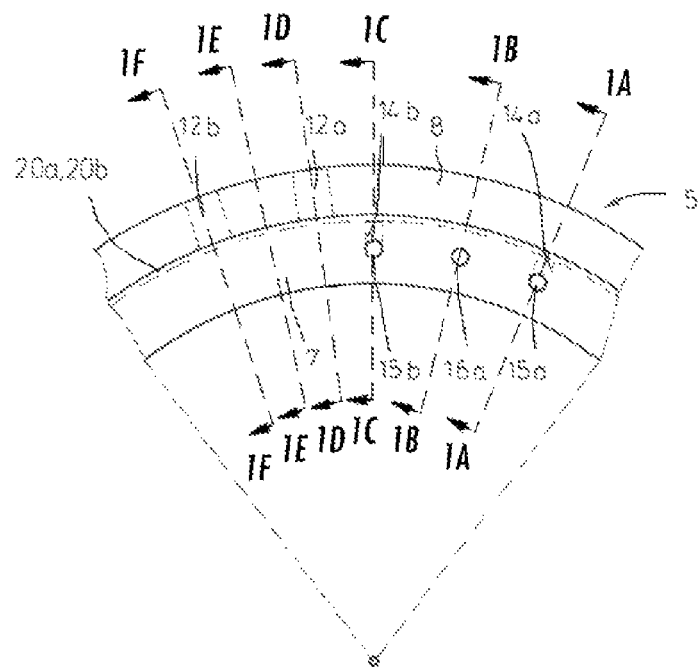
FIG. 2 shows a partial plan view of the rotary union from FIGS. 1a-1f.

The rotary union 5 is shown in part in FIG. 2. The encircling grooves 20a, 20b in the inner ring element 7 and the fluid-carrying passages 12a, 12b in the outer ring element 8 can be seen. The two fluid-carrying passages 15a, 15b and the transverse bore 16a for receiving a screw element 17a—not shown here—can be seen in the inner ring element 7. The transverse bore 16b can be seen in the outer ring element 8 for receiving a screw 17b for fixing the outer ring element 8 to the wheel hub 3. The outer ring element 8 can be moved relative to the inner ring element 7.

Figure 1C:
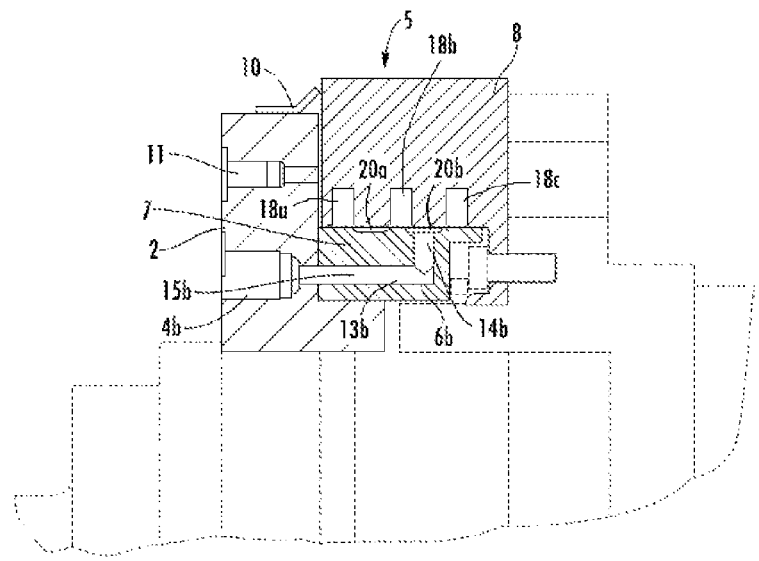
FIG. 1c shows a schematic sectional view of a wheel hub drive with a rotary union having two fluid-carrying passages according to section line 1c in FIG. 2.
Figure 1D:
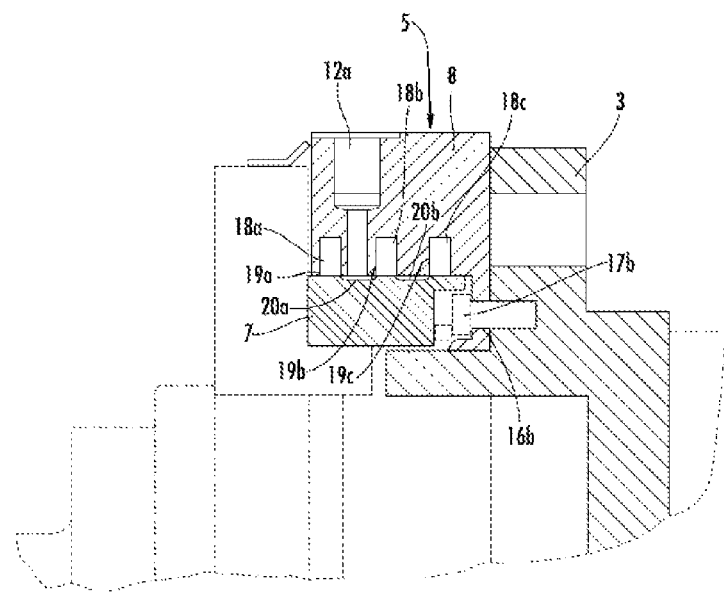
FIG. 1d shows a schematic sectional view of a wheel hub drive with a rotary union having two fluid-carrying passages according to section line 1d in FIG. 2.
Figure 1E:
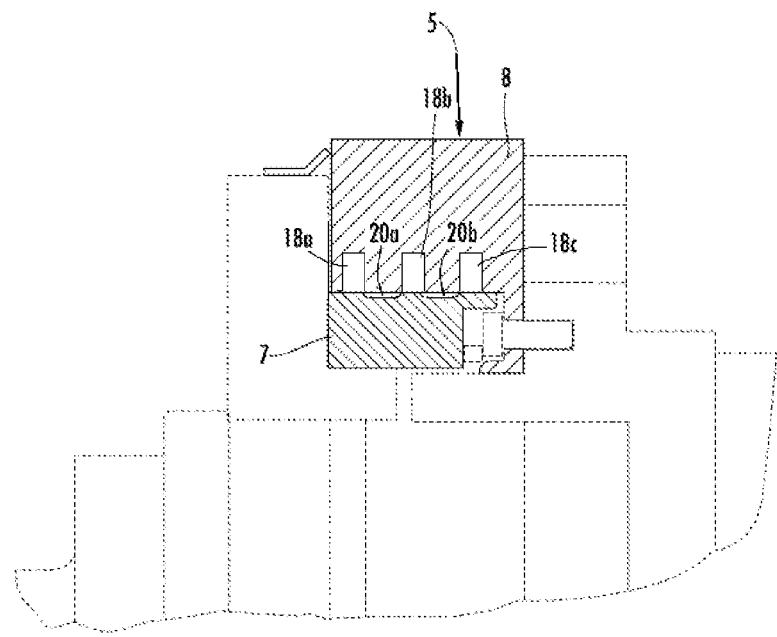
FIG. 1e shows a schematic sectional view of a wheel hub drive with a rotary union having two fluid-carrying passages according to section line 1e in FIG. 2.
Figure 1F:
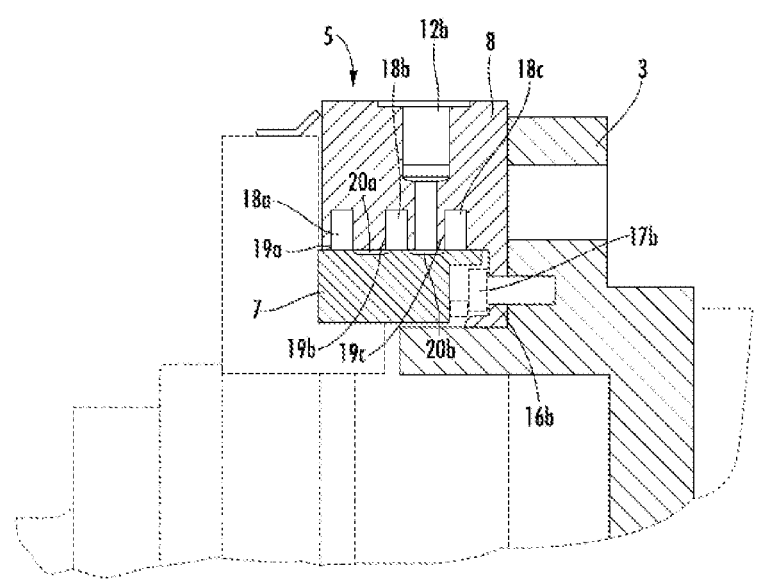
FIG. 1f shows a schematic sectional view of a wheel hub drive with a rotary union having two fluid-carrying passages according to section line 1f in FIG. 2.
Figure 3:
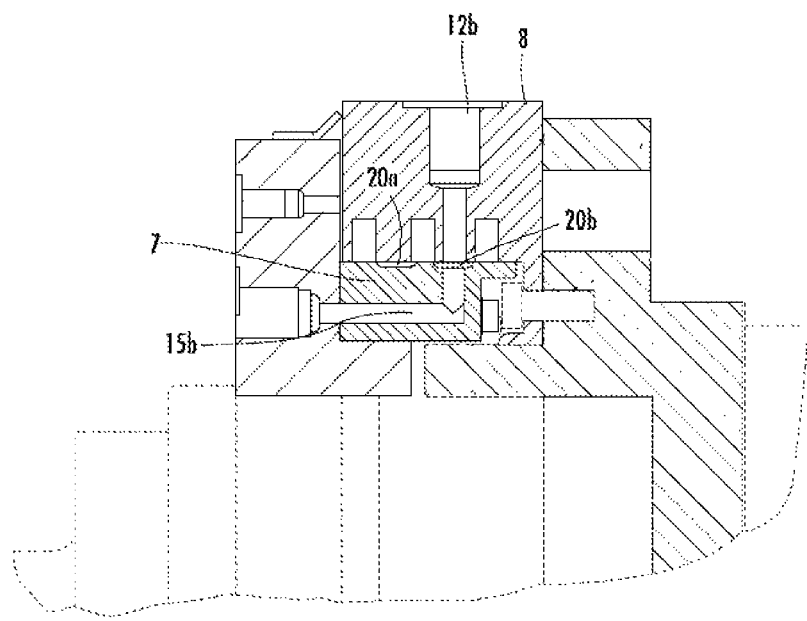
FIG. 3 shows a schematic sectional view of the wheel hub drive from FIGS. 1c and 1f according to section planes 1c and 1f.

FIG. 3 represents the sectional views from FIGS. 1c and 1f, and here the fluid-carrying passage 12b in the outer ring element 8 and the fluid-carrying passage 15b in the inner ring element 7 are aligned with each other.

Figure 4:
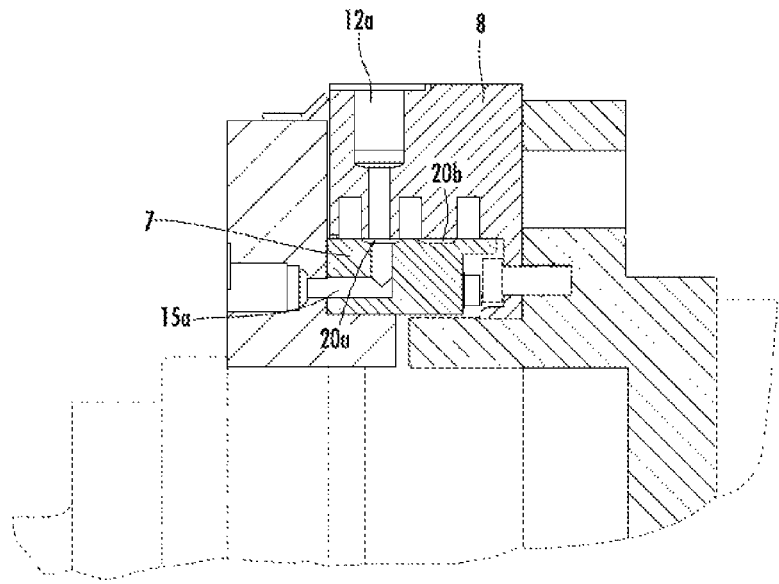
FIG. 4 shows a schematic sectional view of the wheel hub drive from FIGS. 1a and 1d according to section planes 1a and 1d.

FIG. 4 represents the sectional views from FIGS. 1a and 1d, and here the fluid-carrying passage 12a in the outer ring element 8 and the fluid-carrying passage 15a in the inner ring element 7 are aligned with each other.

Figure 5:
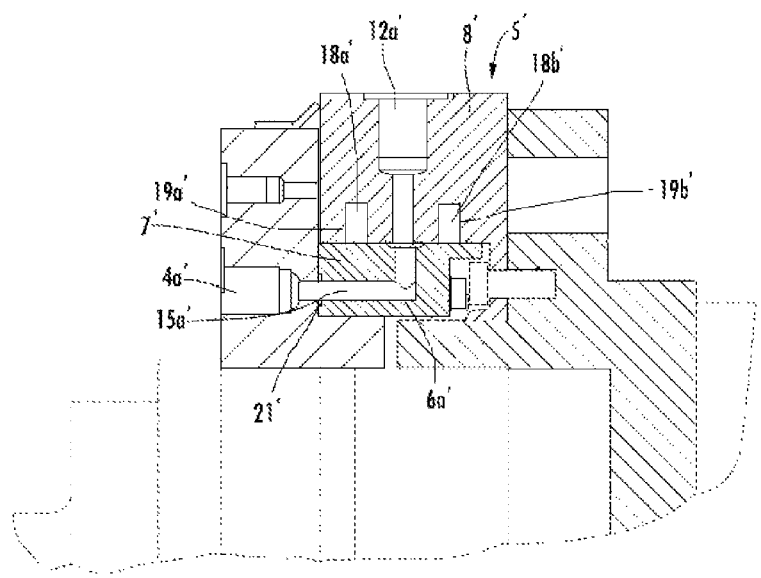
FIG. 5 shows a schematic sectional view of the wheel hub drive with a rotary union having one fluid-carrying passage.

According to a further embodiment, as shown in FIG. 5, the rotary union 5' has only one fluid-carrying passage 6a'. A fluid-carrying passage 12a' is furthermore formed in the outer ring element 8'. Fluid-carrying passage 12a' is aligned with and connected fluidically to the fluid-carrying passage 15a' in the inner ring element 7'. Together with fluid-carrying passage 15a', fluid-carrying passage 12a' forms the fluid-carrying passage 6a' in the rotary union 5'. Fluid-carrying passage 6a' is sealed off fluidically in the axial direction by two dynamic seal elements 18a' 18b'. The two dynamic seal elements 18a', 18b' are situated in recesses 19a', 19b' provided for this purpose in the outer ring element 8'. Since the rotary union 5' has only a single fluid-carrying passage 6a', there is also only one fluid-carrying threaded connection bore 4a', connected thereto, formed in the fixed component 2'. An O-ring 21' for fluidically sealing off the transition between the threaded connection bore 4a' and fluid-carrying passage 6a' is situated axially between fluid-carrying passage 6a' and the threaded connection bore 4a' in a recess provided for this purpose in the inner ring element 7'.

What is claimed is:

1. A wheel hub drive having a planetary transmission, the wheel hub drive defining a combination of fluid-carrying passages that enables regulating a gas pressure of a tire mounted onto the wheel hub drive, and comprising:
    a fixed component that defines a first fluid-carrying passage;
    a wheel hub rotatably movable relative to the fixed component and configured to receive the tire with a gaseous filling; and
    an annular rotary union that defines a second fluid-carrying passage configured to connect the fixed component fluidically to the tire that is positioned axially between the fixed component and the rotatably movable wheel hub, and that includes:
        an inner ring element that is connected to the fixed component in a manner fixed against rotation relative to the fixed component; and
        an outer ring element that is connected to the rotatably movable wheel hub in a manner fixed against rotation relative to the rotatably movable wheel hub; and
    wherein the inner ring element defines:
        at least one transverse bore; and
        at least one further bore that extends radially from a circumferential surface of the inner ring element and intersects with the at least one transverse bore;
        the at least one transverse bore and the at least one further bore together form a fourth fluid-carrying passage that is configured to connect the first fluid-carrying passage of the fixed component fluidically to the tire.

2. The wheel hub drive according to claim 1, wherein the outer ring element and the inner ring element each have at least one transverse bore configured to receive respective screw elements.

3. The wheel hub drive according to claim 1, wherein encircling grooves are formed either on the outer circumferential surface of the inner ring element or on the inner circumferential surface of the outer ring element so as to coincide axially with the third fluid-carrying passage of the outer ring element and with the further bore extending radially from a circumferential surface of the inner ring element.

4. The wheel hub drive according to claim 1, wherein the first fluid-carrying passage in the fixed component passes axially through the fixed component and is connected fluidically to the fourth fluid-carrying passage in the inner ring element.

5. The wheel hub drive according to claim 1, further comprising:
   a dynamic seal element disposed on an outer circumferential surface of the fixed component and on an axial surface of the outer ring element so as to seal off an annular gap formed axially between the fixed component and the outer ring element.

6. The wheel hub drive according to claim 5, wherein the fixed component defines at least one bore configured to feed lubricant into the annular gap.

7. The wheel hub drive according to claim 1, wherein the outer ring element defines a third fluid-carrying passage that extends radially from a circumferential surface of the outer ring element and that is configured to connect the first fluid-carrying passage of the fixed component fluidically to the tire.

8. The wheel hub drive according to claim 7, wherein the wheel hub drive further comprising at least two dynamic seal elements that are configured to fluidically seal the third and fourth fluid-carrying passages, and that are positioned radially between the outer ring element and the inner ring element in respective recesses.

9. A wheel hub drive having a planetary transmission, the wheel hub drive defining at least one fluid-carrying passage that enables regulating a gas pressure of a tire mounted onto the wheel hub drive, and comprising:
   a fixed component that defines a first fluid-carrying passage;
   a wheel hub rotatably movable relative to the fixed component and configured to receive the tire with a gaseous filling;
   an annular rotary union that defines a second fluid-carrying passage configured to fluidically connect the fixed component to the tire that is positioned axially between the fixed component and the rotatably movable wheel hub such that the fixed component and the rotatably movable wheel hub are axially separated by the annular rotary union, and that includes:
      an inner ring element that is connected to the fixed component in a manner fixed against rotation relative to the fixed component; and
      an outer ring element that is connected to the rotatably movable wheel hub in a manner fixed against rotation relative to the rotatably movable wheel hub; and
   at least one transverse bore located on the outer ring element and the inner ring element configured to receive respective screw elements.

10. The wheel hub drive according to claim 9, wherein the outer ring element defines a third fluid-carrying passage that extends radially from a circumferential surface of the outer ring element and that is configured to connect the first fluid-carrying passage of the fixed component fluidically to the tire.

11. The wheel hub drive according to claim 9, wherein the inner ring element defines:
   at least one transverse bore; and
   at least one further bore that extends radially from a circumferential surface of the inner ring element and intersects with the at least one transverse bore;
   the at least one transverse bore and the at least one further bore together form a fourth fluid-carrying passage that is configured to connect the first fluid-carrying passage of the fixed component fluidically to the tire.

12. The wheel hub drive according to claim 11, wherein the first fluid-carrying passage in the fixed component passes axially through the fixed component and is connected fluidically to the fourth fluid-carrying passage in the inner ring element.

13. A wheel hub drive having a planetary transmission, the wheel hub drive defining at least one fluid-carrying passage that enables regulating a gas pressure of a tire mounted onto the wheel hub drive, and comprising:
   a fixed component that defines a first fluid-carrying passage;
   a wheel hub rotatably movable relative to the fixed component and configured to receive the tire with a gaseous filling;
   an annular rotary union that defines a second fluid-carrying passage configured to fluidically connect the fixed component to the tire that is positioned axially between the fixed component and the rotatably movable wheel hub; and that includes:
      an inner ring element that is connected to the fixed component in a manner fixed against rotation relative to the fixed component; and
      an outer ring element that is connected to the rotatably movable wheel hub in a manner fixed against rotation relative to the rotatably movable wheel hub, and that defines a third fluid-carrying passage that extends radially from a circumferential surface of the outer ring element which is configured to connect the first fluid-carrying passage of the fixed component fluidically to the tire; and
   wherein the inner ring element defines:
      at least one transverse bore; and
      at least one further bore that extends radially from a circumferential surface of the inner ring element and intersects with the at least one transverse bore;
      the at least one transverse bore and the at least one further bore together form a fourth fluid-carrying passage that is configured to connect the first fluid-carrying passage of the fixed component fluidically to the tire; and
   the wheel hub drive further comprising at least two dynamic seal elements that are configured to fluidically seal the third and fourth fluid-carrying passages, and that are positioned radially between the outer ring element and the inner ring element in respective recesses.

14. The wheel hub drive according to claim 13, further comprising a dynamic seal element disposed on an outer circumferential surface of the fixed component and on an axial surface of the outer ring element so as to seal off an annular gap formed axially between the fixed component and the outer ring element.

15. The wheel hub drive according to claim 14, wherein the fixed component defines at least one bore configured to feed lubricant into the annular gap.

16. The wheel hub drive according to claim 13, wherein the outer ring element and the inner ring element each have at least one transverse bore configured to receive respective screw elements.

17. The wheel hub drive according to claim 13, wherein respective encircling grooves are formed either on the outer circumferential surface of the inner ring element or on the inner circumferential surface of the outer ring element so as to coincide axially with the third fluid-carrying passage.

18. The wheel hub drive according to claim 13, wherein the first fluid-carrying passage in the fixed component passes axially through the fixed component and is connected fluidically to the fourth fluid-carrying passage in the inner ring element.

\* \* \* \* \*